(12) United States Patent
Peterkofsky et al.

(10) Patent No.: US 8,046,161 B2
(45) Date of Patent: Oct. 25, 2011

(54) TRANSPORTATION PLANNING WITH RULE-BASED RELEASE OF TRIPS FOR EXECUTION

(75) Inventors: Roy I. Peterkofsky, San Francisco, CA (US); Hema Budaraju, Fremont, CA (US); Roger J. A. Goossens, Belmont, CA (US); Atul Kumar Srivastav, Andhra Pradesh (IN); Vijay Pillarisetti, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1588 days.

(21) Appl. No.: 11/173,314

(22) Filed: Jun. 30, 2005

(65) Prior Publication Data

US 2007/0005236 A1    Jan. 4, 2007

(51) Int. Cl.
*G06Q 50/00* (2006.01)
(52) U.S. Cl. ........................................ 701/201; 705/337
(58) Field of Classification Search .................... 701/201
See application file for complete search history.

(56) References Cited

U.S. PATENT DOCUMENTS

| | | | | |
|---|---|---|---|---|
| 5,758,329 | A * | 5/1998 | Wojcik et al. | 705/28 |
| 6,879,962 | B1 * | 4/2005 | Smith et al. | 705/22 |
| 6,885,902 | B2 * | 4/2005 | Crampton et al. | 700/99 |
| 6,898,472 | B2 * | 5/2005 | Crampton et al. | 700/97 |
| 7,050,995 | B2 * | 5/2006 | Wojcik et al. | 705/28 |
| 7,171,426 | B2 * | 1/2007 | Farmer et al. | 422/2 |
| 7,216,004 | B2 * | 5/2007 | Kohn et al. | 700/28 |
| 7,539,630 | B2 * | 5/2009 | Crampton et al. | 705/26.1 |
| 7,761,337 | B2 * | 7/2010 | Caballero et al. | 705/26.4 |
| 2002/0019759 | A1 * | 2/2002 | Arunapuram et al. | 705/7 |
| 2002/0138360 | A1 * | 9/2002 | Inoue et al. | 705/26 |
| 2002/0156663 | A1 * | 10/2002 | Weber et al. | 705/7 |
| 2003/0105542 | A1 * | 6/2003 | Arnold et al. | 700/102 |
| 2003/0126023 | A1 * | 7/2003 | Crampton et al. | 705/22 |
| 2003/0126024 | A1 * | 7/2003 | Crampton et al. | 705/22 |
| 2003/0149631 | A1 * | 8/2003 | Crampton et al. | 705/22 |
| 2003/0177050 | A1 * | 9/2003 | Crampton et al. | 705/8 |
| 2004/0107110 | A1 | 6/2004 | Gottlieb et al. | 705/1 |
| 2004/0153379 | A1 * | 8/2004 | Joyce et al. | 705/28 |
| 2005/0055285 | A1 * | 3/2005 | Myrick et al. | 705/28 |
| 2005/0075952 | A1 * | 4/2005 | Zhang et al. | 705/28 |

(Continued)

OTHER PUBLICATIONS

Bill Schineller, "Joe's Juggling Act", OR/MS Today, Dec. 1998, pp. 1-8.

(Continued)

*Primary Examiner* — Shelley Chen
(74) *Attorney, Agent, or Firm* — Silicon Valley Patent Group LLP; Omkar Suryadevara

(57) ABSTRACT

A computer, for planning moves of freight automatically receives a plan containing a number of trips to be performed to move freight using vehicles, and partially releases only a portion of the plan for execution instead of releasing the entire plan. The plan portion that is released includes a subset of trips that are selected by the computer from among all trips in the entire plan. Thereafter, the computer simply repeats the just-described acts. Iteratively releasing portions of a plan allows the computer to be instructed to release early certain trips that are satisfactory. Trips that are sub-optimal are re-generated in a next version of the plan, based on changes in orders in the interim. The computer may also be instructed to release a trip even if sub-optimal, if its time-to-departure becomes less than an advance notice needed by a truckload service that is to execute the trip.

21 Claims, 12 Drawing Sheets

U.S. PATENT DOCUMENTS

2006/0116893 A1* 6/2006 Carnes et al. .................. 705/1

OTHER PUBLICATIONS

Chapter 4 entitled "Material Requirements Planning" in "Oracle Master Scheduling/MRP and Oracle Supply Chain Planning User Guide" by Susan Saperstein and Scott Malcolm, Release 11i, vol. 1, published Jan. 2000, 86 pages.

Entire prosecution history of U.S. Appl. No. 11/093,830, filed Mar. 30, 2005 by Goossens et al. entitled "Transportation Planning With System Assisted Exception Resolution".

Entire prosecution history of U.S. Appl. No.11/067,154, filed Feb. 25, 2005 by Peterkofsky et al. entitled "Transportation Planning With Drop Trailer Arrangements".

Entire prosecution history of U.S. Appl. No. 11/136,167, filed May 23, 2005 by Sanchez et al. entitled "Scheduling With Layovers and Layover Charge Computation in Transportation Planning".

Entire prosecution history of U.S. Appl. No. 11/136,045, filed May 23, 2005 by Peterkofsky et al. entitled "Mission-Specific Vehicle Capacity Constraints for Transportation Planning".

* cited by examiner

FIG. 2C

| Exception Group | Exception Type | Rank | Threshold | UOM | Release |
|---|---|---|---|---|---|
| Unplanned Delivery Lines | Infeasible Piece Weight or Volume | 4 | | % | Unrestricted |
| Unplanned Delivery Lines | Infeasible Piece Dimensions | 5 | | % | Unrestricted |
| Unplanned Delivery Lines | Missing Distance Data | 6 | | | Unrestricted |
| Early and Late Exceptions | Planned Late Delivery | 7 | 60 | MIN | Manual |
| Early and Late Exceptions | Planned Early Delivery | 8 | 120 | MIN | Manual |
| Early and Late Exceptions | Planned Late Ship | 9 | 60 | MIN | Unrestricted |
| Early and Late Exceptions | Planned Early Ship | 10 | 120 | MIN | Unrestricted |
| Early and Late Exceptions | Past Due Order | 11 | 1 | HR | Unrestricted |
| Early and Late Exceptions | Insufficient Transit Time | 12 | 1 | HR | Unrestricted |
| Facility Exceptions | Facility Dock Capacity Exceeded | 13 | 5 | % | Unrestricted |
| Facility Exceptions | Facility's Handling Capacity Exceeded | 14 | 10 | % | Unrestricted |
| Facility Exceptions | Facility - Vehicle Incompatibility | 15 | | | Manual |
| Facility Exceptions | Pool Facility - Carrier Incompatibility | 16 | | | Manual |

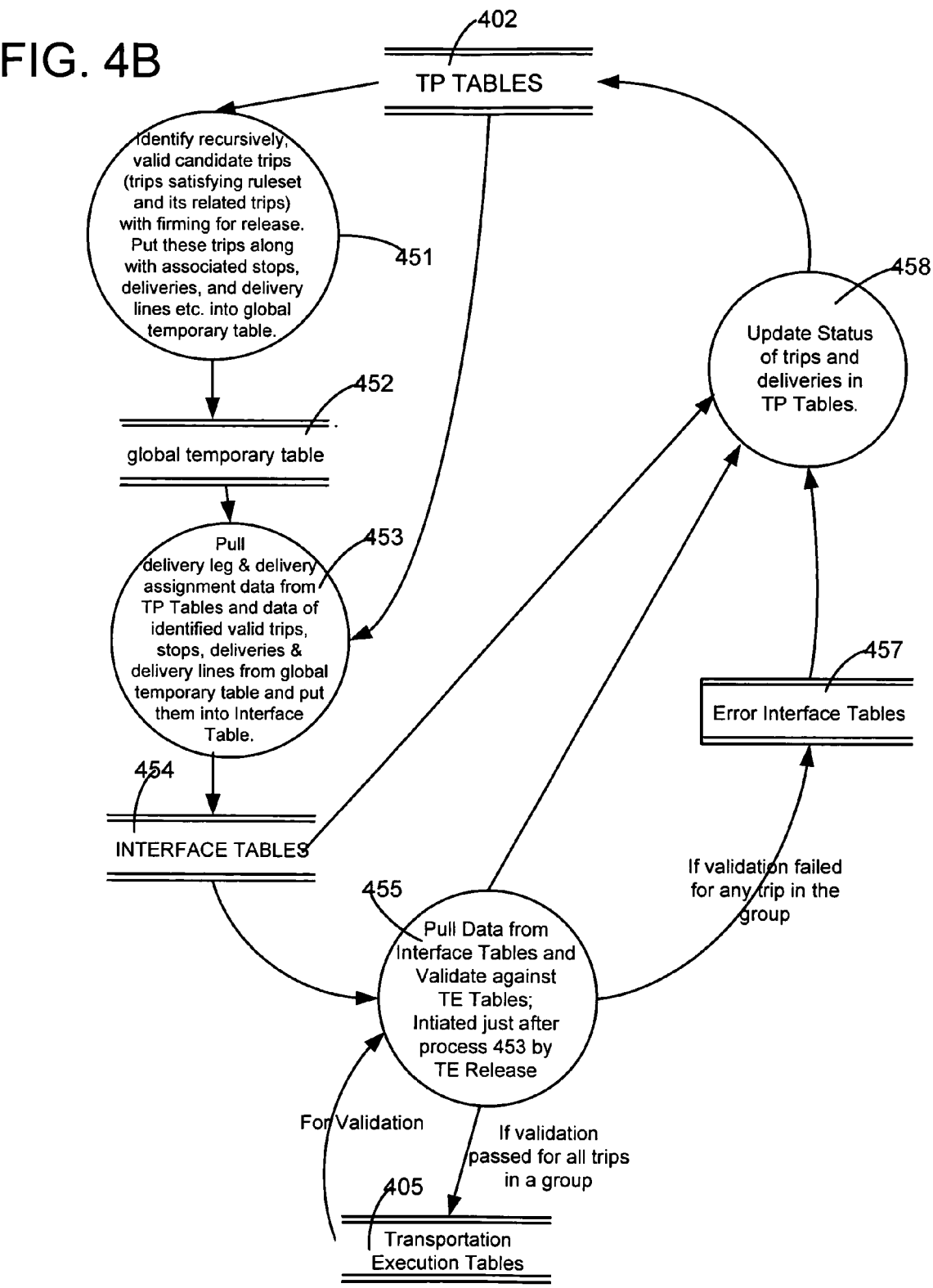

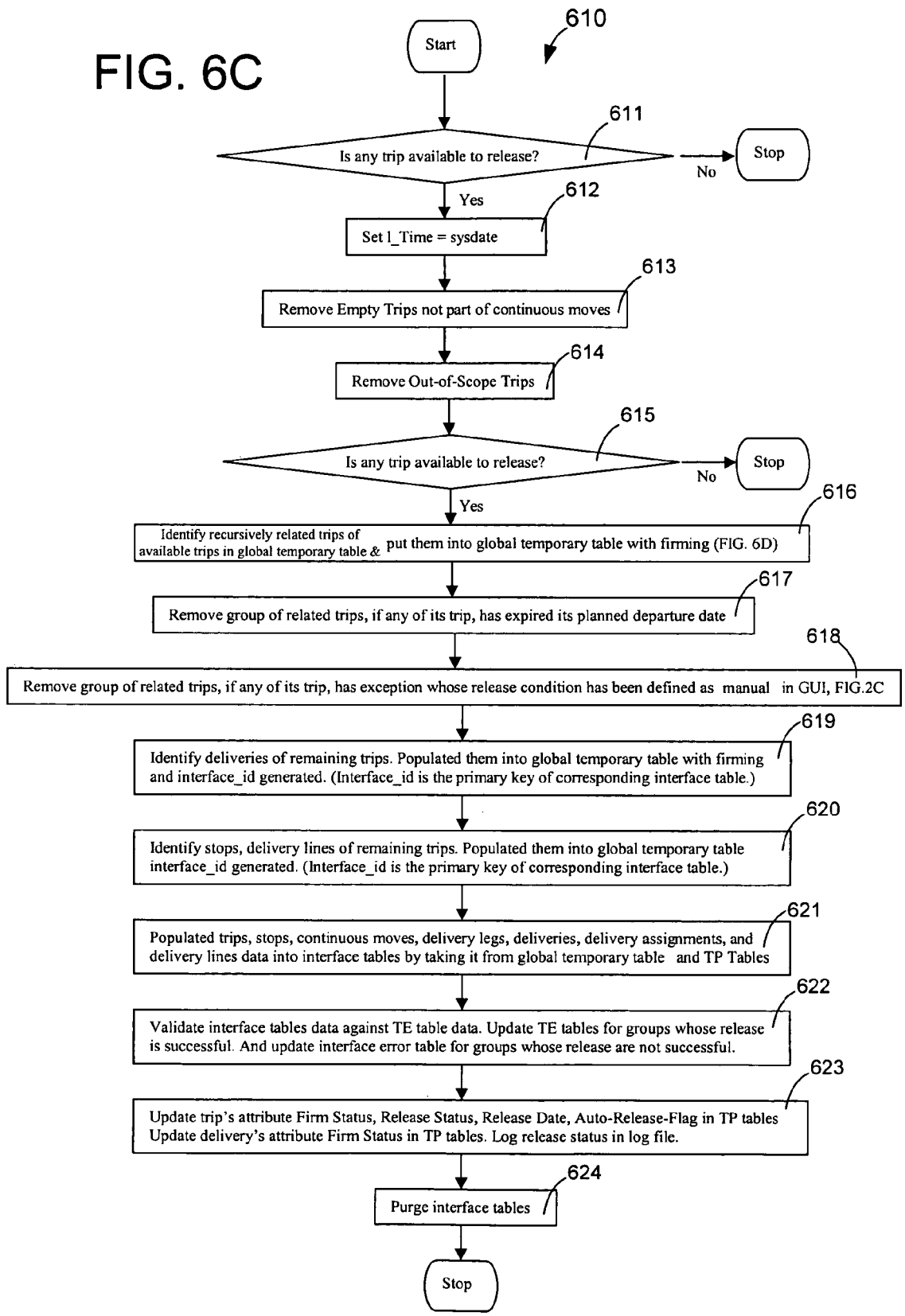

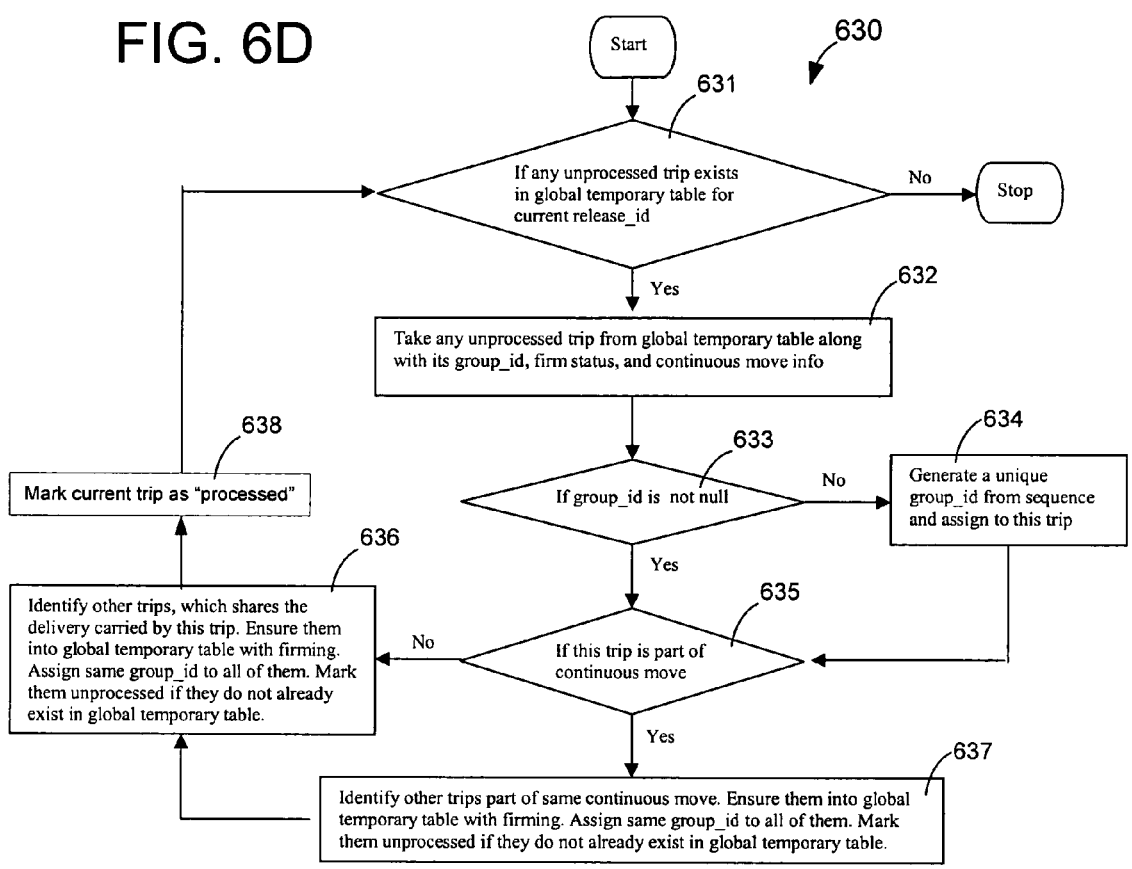

TRANSPORTATION PLANNING WITH RULE-BASED RELEASE OF TRIPS FOR EXECUTION

BACKGROUND

Shipments (also known as transportation orders, shipment orders, delivery orders, or simply orders) are movements of goods and constitute the basic element of transportation planning. Starting with orders for movement of goods (i.e. shipments), transportation planning involves creation of groups of shipments that can be moved together by single vehicles performing trips (which may require multiple stops). Specifically, shipments of small sizes that would otherwise be sent by Less than Truckload (LTL), Less than Containerload (LCL), Less than Carload (also abbreviated LCL), or Parcel services may be grouped into trips (also called voyages, journeys or missions) to be performed by full Truckload (FTL or just TL), full containerload (FCL), or full carload (also FCL) services. Full truckload services are provided by certain transportation carriers, for example, J. B. Hunt, Schneider National and Werner Enterprises. Full containerload services are offered both by ocean carriers (for example, Maersk Sealand or APL) and by domestic intermodal transportation carriers (for instance, Hub System or Pacer Stacktrain). Less than Containerload services are typically offered by Non-Vessel Operating Common Carriers (NVOCCs), intermediaries that offer "retail" movement of small shipments via space purchased "wholesale" from ocean carriers. Full carload and less than carload services are both offered by major and local freight railroads (such as Norfolk Southern and Burlington Northern Santa Fe). LTL services are provided by several transportation carriers, for example, Yellow Freight and Roadway Express. Parcel services are provided by many transportation carriers, for example, UPS, FedEx and DHL.

Creation of trips by grouping multiple orders is typically performed in companies (also called "shippers") that own the goods and move them from/to vendors/customers, e.g. via trucks operated by truckload and other services (also called "carriers") on public highways, via ocean carriers, or via rail carriers. Shipments in a transportation plan can be inbound for moving raw materials to a factory, from a number of vendors, or outbound for moving finished products from the factory, to various customers. Planning inbound and outbound shipments together allows continuous movement of trucks or containers which, due to minimization of empty ("dead-head") movement of the truck or container, can be more efficient and less expensive than individual direct moves.

Companies that plan trips as described above typically use a transportation management system implemented by an appropriately programmed computer. The transportation management system has several software components, including a planning component and an execution component. The planning component focuses on creation of trips, typically consolidating multiple shipments, and the created trips are output in a transportation plan. The principal tasks of the planning component are typically executed in a computer as a batch job, with the transportation plan as its output.

A transportation plan prepared by a computer is typically examined, by a human transportation planner (also called "operator" and "user"), who may edit or "tweak" several of the trips therein. For example, during such review if a human transportation planner finds a trip to be overly circuitous or inefficient, that trip is manually modified, e.g. by moving one or more of its orders to another trip that happens to be also going from/to the same origin/destination (or a neighborhood thereof, or passing therethrough). Such manual modification of trips in a plan is time consuming because the human transportation planner must review numerous trips in order to decide how the overly-circuitous trip is to be modified.

Typically, a transportation planner spends up to eight hours (i.e. a whole business day) in manually reviewing and re-working all of the trips in a plan that has been generated by the planning component. At the end of the day, the transportation planner typically releases the modified plan (in its entirety) to the execution component for further processing, such as rating, tendering, booking, tracking, tracing, and so on. In some systems, a specific interface process communicates the manually-modified plan to the execution system, in a mechanism here referred to as "release".

Note that in such systems, a trip that is satisfactory to the human transportation planner (either with or without tweaking) may be individually released for execution. However, to the knowledge of the inventors, no existing transportation management system allows their operator to manually release, in a single operation, more than one selected trip in a plan (but not the entire plan). The prior art systems enable an operator to release a transportation plan in its entirety (e.g. after all trips therein are satisfactory), or just one trip therefrom, but not a group of trips.

In certain transportation management systems, an unmodified plan, in the form output by the planning component, is made available to the execution component, without any manual intervention. Even in such systems, even after execution of the trips has begun, a transportation planner may manually evaluate which trips should be further progressed by execution processes, while other trips are to be kept under review and subject to manual modification. This may lead to a reduction in cost savings when a trip that is not fully utilized (i.e. having usable empty space on the vehicle making the trip) is automatically progressed to execution, and becomes tendered and booked by the execution system, because the planner can no longer change a trip once it reaches that state. Therefore, the human transportation planner may miss out on further consolidation opportunities to improve utilization of that vehicle, even though he may have already spent time performing the analysis to do so. Moreover, as there are typically hundreds of trips in a plan, manually evaluating and progressing trips is also time consuming and cumbersome.

One disadvantage of manual involvement in the release of trips, is that after an eight hour day a plan which has just been released may no longer be valid, e.g. if new orders have come in and/or existing orders have been modified or canceled, while manual review was being done. To accommodate such changes in orders, the plan may need to be manually re-worked some more at this stage, further delaying release of the plan to the execution component. Another disadvantage is that by the time the plan is released, it may become too late or too expensive to find a carrier to perform one or more trips in the plan. This is especially true when carrier capacity is tight because the carrier's capacity may be reserved or used up by other shippers who booked or tendered their needs sooner. Orders in such trips may have to be sent by more expensive services (e.g., Less than Truckload or Less than Containerload) due to the unavailability of truckload services on short notice.

SUMMARY

In planning movement of freight (i.e. cargo), by use of one or more transportation carriers, a computer is programmed, in accordance with the invention, to automatically release only a portion of (instead of the entirety of) a plan that contains a number of trips to be performed to move freight. The plan portion that is released includes a subset of trips that are selectively identified by the computer, from among all trips in the entire plan. The trips in the plan that are not released remain unused, and may be discarded due to obsolescence by trips in a new version of the plan. A new version of the plan can be created after the just-described partial release, to take into account new orders or changes in orders that occur between each successive plan creation. After the new plan is created, the partial release is repeated, on the new plan, followed by creation of yet another new plan followed by yet another partial release. In this manner, a computer-implemented method in accordance with the invention repeatedly creates a plan, but releases only a portion thereof.

Iteratively and repeatedly releasing portions of a plan over a period of time allows the computer to be instructed to release selected trips early, as soon as they are deemed to be satisfactory, rather than waiting until the entire plan becomes sufficiently satisfactory to be released. As noted in the background section, re-working an entire plan can take a whole business day (e.g. eight hours). Hence a partial release of selected trips, as soon as they are deemed satisfactory, in accordance with the invention, allows a transportation carrier to be notified about these trips further in advance, which is an advantage over the prior art.

Moreover, one or more trips that are sub-optimal may be obsoleted in a new version of the plan, based on changes to previously-received orders and/or new orders that arrive in the interim. In some situations, trips that were previously unsatisfactory (for instance, not of high enough utilization) become more satisfactory e.g. on inclusion of new orders therein, or new trips that replace one or more previously sub-optimal trips may be generated in a new version of the plan. New trips may be optimal or sub-optimal, depending on the orders. Repeated creation of a plan eliminates or minimizes manual work to make trips optimal, which is another advantage over the prior art.

In iteratively releasing portions of a plan over a period of time, certain trips may be sub-optimal even as the amount of time left before departure of the trips becomes close to or less than an advance notice normally required by a transportation carrier. To improve the likelihood that such sub-optimal trips are executed by the chosen transportation service provider (i.e. carrier), the computer may be instructed to go ahead and release a sub-optimal trip, as soon as its time-to-departure becomes less than the advance notice. Therefore, a last-minute rush to find a desirable service that will accept a trip, or the expensive alternative of sending orders in the trip by more expensive services (e.g., Less than TruckLoad (LTL)), is avoided, which is another advantage over the prior art.

BRIEF DESCRIPTION OF THE FIGURES

FIGS. 2A, 2B and 2C illustrate, in a graphical user interface, screens for receiving from a human transportation planner (i.e. operator or user) rules to be used in selecting the trips to be released in act 104A of FIG. 1B, and a type of the release.

FIGS. 4A-4B illustrate, in data flow diagrams, one illustrative implementation of an embodiment of the invention.

FIGS. 6A-6D illustrate, in flow charts, acts performed by a programmed computer to implement an automatic release mechanism in a transportation management system in some embodiments of the invention.

DETAILED DESCRIPTION

Figure 1A:
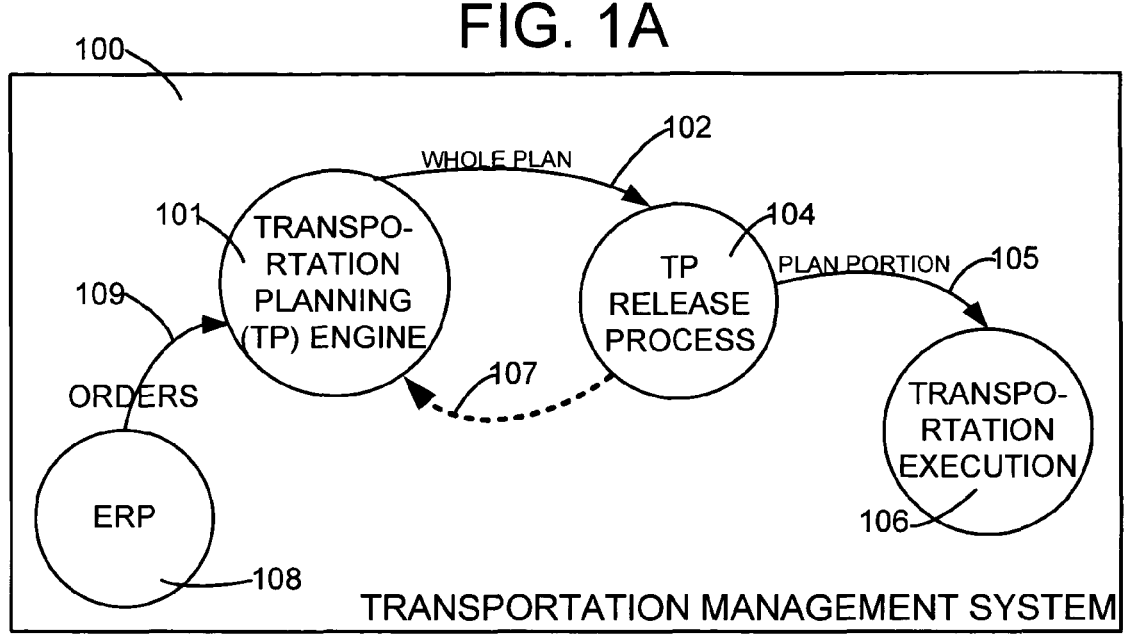
FIG. 1A illustrates, in a high-level block diagram, a transportation management system in accordance with the invention comprising a release process 104 that automatically releases only a portion of a whole plan that it receives from a transportation planning engine 101.

In planning movement of freight (i.e. cargo), a computer 100 (FIG. 1A) is programmed, in accordance with the invention, with a release process 104 that receives an entire plan that contains a number of trips to be performed to move freight, but releases only a portion of (instead of the entirety of) the plan, when invoked automatically or manually. The release process 104 (also called "TP release process") receives the whole plan from a transportation planning engine 101 (see path 102) and only partially releases the plan, i.e. releases a portion of the plan, to transportation execution software 106 (see path 105).

A plan portion that is released in this manner includes a number of trips (typically more than one trip) that are selected by computer 100 from among all trips in the entire plan. In some embodiments, a partial release is performed by automatic invocation of a release process by computer 100 itself, prior to manual re-working (or tweaking) of the plan (which may or may not be performed depending on the embodiment and subsequent to re-working the same release process may or may not be manually invoked). Hence, trips in a partial release are progressed to execution soon after the plan has been created (e.g. within a few seconds thereof), which results in a carrier being notified about these trips well in advance of prior art methods in which the plan is re-worked or tweaked typically for a whole day before the plan (in its entirety) is released for execution.

After a partial release, transportation planning (TP) engine 101 (which may be informed about the performance of partial release via path 107 in FIG. 1A), repeats its act of creation, to create a new version of the plan. The new version of the plan obsoletes (and overwrites in some embodiments) a current version of the plan, and in this manner may discard trips that were not included in the partial release that had just been completed. TP engine 101 creates each plan based on orders supplied (on path 109) by an enterprise resource planning (ERP) or similar source software 108. As will be apparent to the skilled artisan, orders are received by ERP software 108 at any time, i.e. asynchronously, regardless of whether or not TP engine 101 is in the midst of creating a plan (as per act 101A in FIG. 1B), or TP release process 104 is in the midst of partially releasing a portion thereof (as per act 104A). TP engine 101 typically receives orders as per act 109A in FIG. 1B, prior to act 101A in which a plan is created and also subsequent to act 104A in which a plan portion is released, but not between these two acts 101A and 104A.

During a normal day, one or more new orders are typically received, and/or previously-received orders are changed by ERP software 108, after TP engine 101 starts to create a current plan. Hence, new orders and changes in previously-received orders are taken into account during a next iteration (as per branch 107A in FIG. 1B), i.e. whenever a new plan is prepared next by TP engine 101. In some embodiments, TP engine 101 repeatedly creates plans throughout the day automatically, e.g. periodically once an hour, once every half-hour or even aperiodically once every few minutes depending on the embodiment. This is in contrast to certain prior art business practices, wherein a new plan is created just once every day.

In preparing a new plan, TP engine 101 uses orders in un-released trips as well as any changes to the un-released orders and/or new orders that have arrived in the interim. Depending on the situation, trips that were previously sub-optimal may become satisfactory in the new plan, and/or new trips (that may or may not be satisfactory) are generated in the new plan. Iterative re-generation of a plan by computer 100 (FIGS. 1A and 1B) eliminates manual work otherwise needed to make trips satisfactory, which is an advantage over the prior art.

Note that the iteration of act 101A, via branch 107A, may be performed after a predetermined delay following act 104A, or with no delay depending on the embodiment. In alternative embodiments, act 101A is performed on a periodic schedule that is predetermined, e.g. performed at the top of each hour. In such embodiments, the operator may manually re-work one or more trips after a partial release is automatically invoked and completed and before the new plan is automatically created. In several embodiments, such newly re-worked trips (by the operator) could be firmed and/or manually released partially (as per FIG. 6E described below) before the next plan run is initiated.

Some embodiments use software (such as an Oracle tool, the Workflow engine) to automatically implement act 107A (shown dashed in FIG. 1B) and path 107 (shown dashed in FIG. 1A). Other embodiments do not have pre-built a mechanism to start the next plan optimization immediately upon completion of the previous one, or after a defined delay starting thereupon. Mechanisms included in several such embodiments start the next plan run on a defined schedule or start the next plan after a defined delay from the start of the previous plan run.

The specific manner in which transportation planning engine 101 and transportation execution software 106 are actually implemented is not a critical aspect of the invention. Specifically, both engine 101 and software 106 can be from any commercially-available transportation management system for planning movement of freight by use of one or more carriers that operate transportation services of various modes (including but not limited to operation of wheeled vehicles on public highways). Transportation management systems that can be used with (or that can be modified to contain) TP release process 104 are available for direct purchase or as a web-hosted service from several vendors, such as the following:

(a) "i2 Transportation Planning and Management" available from i2 Technologies, Inc. One i2 Place, 11701 Luna Road, Dallas, Tex. 75234;

(b) "Manugistics Global Logistics Management solution" available from Manugistics, Inc. 9715 Key West Avenue, Rockville, Md. 20850

(c) GC3 (Global Command & Control Center) available from Global Logistics Technologies, 1 Reservoir Corporate Centre, Shelton, CT 06484;

(d) "DLx® Transportation Management System" available from Red Prairie of 20700 Swenson Drive, Waukesha, Wis. 53186; and (e) "Transportation Planning and Execution solution" available from Manahattan Associates, 2300 Windy Ridge Parkway, Suite 700, Atlanta, Ga. 30339; and (f) "Transportation Planning & Optimization" available from SAP America Inc. Strategic Planning & Support Office, 3999 West Chester Pike, Newtown Square, Pa. 19073.

Note that one embodiment of the invention uses "Oracle Transportation Planning 11i.10" and "Oracle Transportation Execution 11i" both available from Oracle Corporation, 500 Oracle Parkway, Redwood Shores, Calif. 94065.

Computer 100 of some embodiments is programmed to select the trips to be released by applying a set of rules, when invoked either automatically (e.g. on completion of plan creation) and/or manually (as per FIG. 6E), depending on the embodiment. In several embodiments, application of the set of rules is invoked automatically on plan creation and in addition, manual invocation is supported as well. Each rule contains one or more conditions on one or more attributes (also called "parameters") of a trip, and trips meeting the condition(s) are automatically selected for release. Such condition(s) may contain one or more values (e.g. to be used as limits on the value of an attribute). When a rule contains more than one condition, each condition must be satisfied in order for the trip to be selected for release. When the set of rules contains more than one rule, conformity with any rule is sufficient for the trip to be selected for release.

One exemplary condition imposes a minimum requirement on capacity utilization of a vehicle to be used in performing the trip, e.g. the condition is met if utilization in a trip is greater than 90%. Examples of other attributes of a trip on which a condition may be set are name of carrier, name of supplier picked up from, name of customer delivered to, and mode of service (e.g. truckload, rail, ocean, LTL, parcel etc). An exemplary rule may release all trips that have utilization greater than 90% and are assigned to carrier JB Hunt.

Another exemplary condition imposes a minimum requirement (based on advance notice) on the time-to-departure of the trip. The time-to-departure of a trip is computed as the difference between the current time and a scheduled departure time of the trip. An exemplary rule may release all trips that have a time-to-departure less than 24 hours. The just-described rule, also referred to as a "running-out-of-time rule" ensures that a trip that remains sub-optimal until the last minute can still be executed by the desired type of service.

By using running-out-of-time rules, a last-minute rush to find a desirable transportation service provider (e.g., a truckload carrier) that will accept the trip, or sending orders in the trip by less desirable services (e.g., Less than Truckload (LTL)) is avoided, which is an advantage over the prior art. Moreover, errors made by a human transportation planner are avoided by use of such rules. For example, a human may miss releasing one or more trips that are scheduled to depart in a short while, leading to those trips having to be re-planned and expedited using more expensive means of transportation. Correction of such errors is a tedious process for the planner that increases the operational planning cycle time while reducing cost savings.

Yet another condition that may be included in rules used by computer 100 is a maximum limit on circuity of a trip to be released. In one example, trips with circuity less than the maximum limit are selected for release (if this was the only condition). As is known in the art, circuity (or "out of route percentage") is calculated as a percentage of the difference between (1) total distance traveled on a multi-stop trip and (2) direct distance between the origin (first) and destination (last) stops. Circuity is a common measure of the efficiency of a multi-stop trip (more circuity equates to less efficient routing) and, therefore, planners may want to release for execution trips with less circuity while holding back trips with more circuity.

Figure 2A:
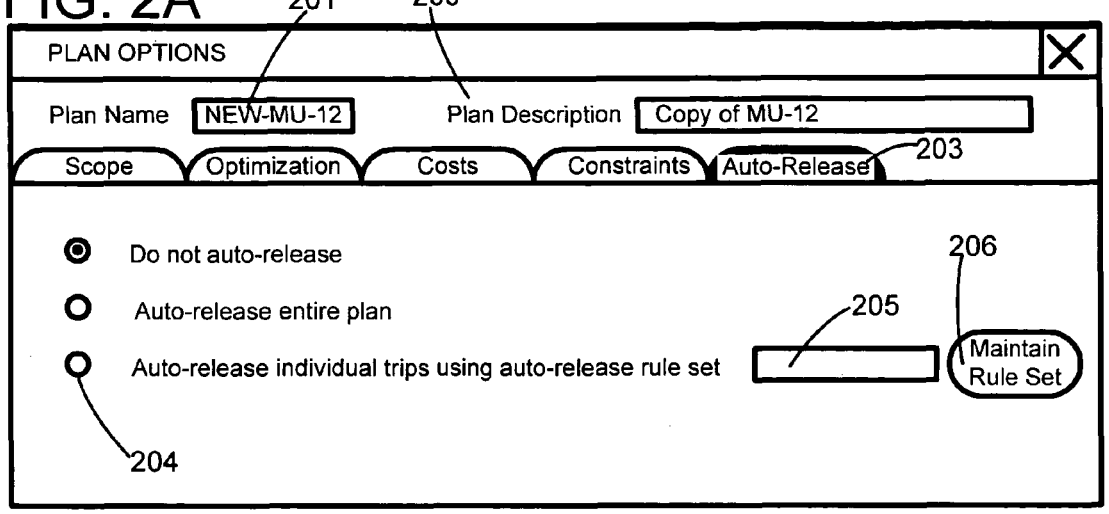
Figure 2B:
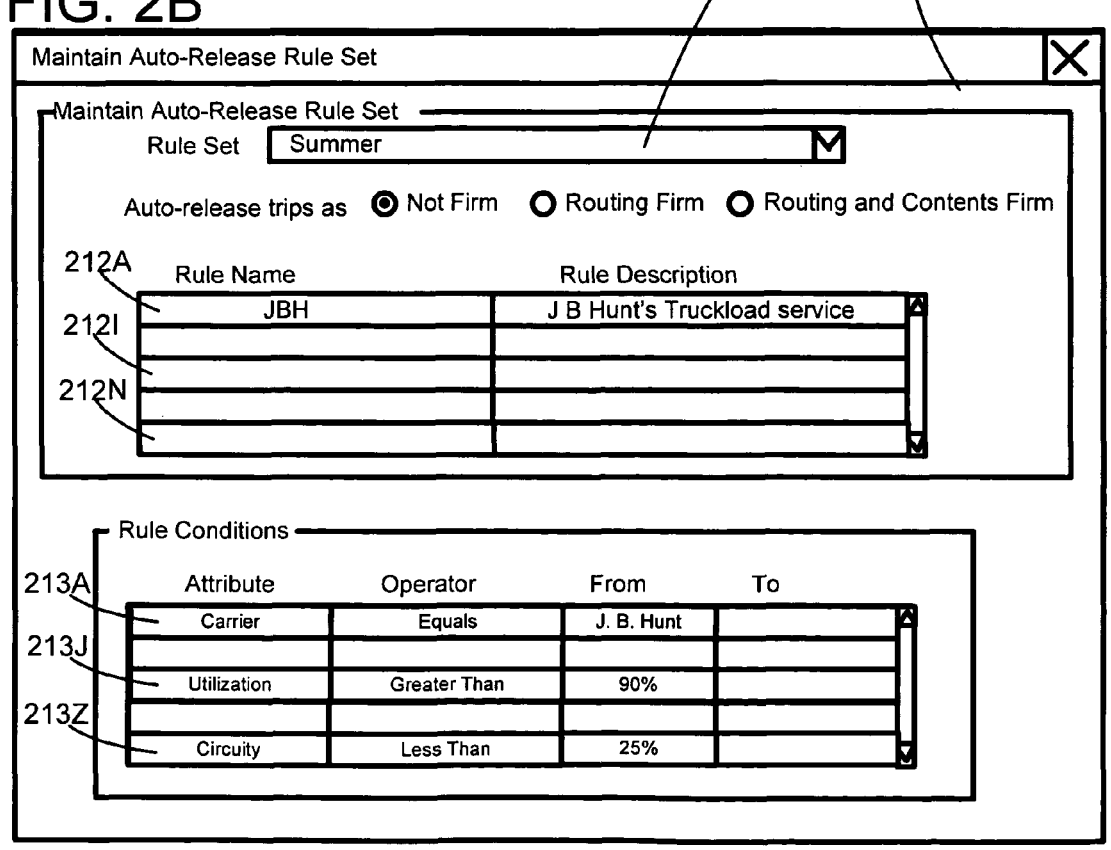

The attributes that are used in a condition, the condition(s) in a rule, and the rule(s) in a set to be used to release trips from a plan may be either stored directly in computer 100 (e.g. in a database by use of SQL queries) or received as input through a graphical user interface as illustrated by screens 200 and 210 in FIGS. 2A and 2B. Specifically, screen 200 is used by the human transportation planner to set up a plan which is identified by a name in field 201. In setting options of the plan, the human transportation planner may select a tab 203 to specify options for release of a plan created by the planning engine. The default option in screen 200 is not to automatically release any trips, and the human transportation planner may release the entire plan after manually re-working trips therein, in the normal manner.

In screen 200, the human transportation planner may select radio button 204 to specify automatic release of selected trips by invocation of TP release process 104 (FIG. 1A) on completion of plan creation by planning engine 101. On selecting radio button 204, the human transportation planner must also specify the name of a set of rules to be used in releasing trips from the plan. If the set of rules was previously defined, then nothing further is required at this stage. If a previously-defined set of rules needs to be revised, or if a new set of rules needs to be defined, the human transportation planner may click on button 206 (FIG. 2A), which causes screen 210 (FIG. 2B) to be displayed.

In screen 210, the human transportation planner can select a previously-defined rule set in a field 211, or type in the name of a new rule set to be defined. Screen 210 (FIG. 2B) displays in fields 212A-212N all of the rules that are present in the rule set identified in field 211. In the example illustrated in FIG. 2B, there is only one rule which is identified by its name "JBH". On selection of any rule 212I (wherein A≦I≦N, with N being the number of rules), that rule's conditions are identified in fields 213A-213Z. In the example illustrated in FIG. 2B, there are three conditions, namely that the carrier must be J.B. Hunt, the utilization must be greater than 90% and the circuity must be less than 25%. If all three conditions are met by a trip, then that trip is automatically selected for release, without any manual intervention.

Note that in the embodiment illustrated in FIG. 2B, for each condition, the human transportation planner identifies at least three items of information (1) attribute (2) operator and (3) value. In some rules the human transportation planner may identify two values, e.g. a maximum limit and a minimum limit, thereby to specify a range. For example, if the application of a rule is to be limited to a specific season, such as summer, the human transportation planner may set up a rule with the attribute as current time, the operator as between, and two limits as May and August. Note that the current time is not an attribute of the trip, but instead it is the time at which the rule is being applied.

As noted above, orders in a plan portion that has been released are not used by TP engine 101 in creating a plan, in several embodiments. Some embodiments release one or more selected trips of a plan as "not firm" (during the above-described partial release), in which case orders in the "not firm" trip continue to be taken into account in the planning performed by engine 101, until a stage is reached whereby the corresponding trips are released as "firm." Some embodiments enable a human transportation planner to set the type of release as a plan option for automatic release of trips in screen 210 (FIG. 2B).

While some examples of attributes have been described above and illustrated in the drawings attached hereto, as will be apparent to the skilled artisan in view of this disclosure, any other attributes may be used in other embodiments. Examples of attributes that are available for use in a rule's condition in some embodiments include customer's state or county, whether or not the trip is included in a continuous move, the type of orders in the trip (i.e. inbound purchase order or outbound sales order), mode of the trip (ocean, rail, air, truck, etc.), service level of the trip (e.g. single-driver standard truck/trailer, tag team, parcel service by ground, parcel service by next day air, etc), and the type of vehicle.

Examples of additional attributes that are also available for use in a rule's condition in a few embodiments also include the number of stops in a trip, the total duration of the trip, the nature of commodities being transported (e.g. frozen food, hazardous material etc), the identity of a driver to perform the trip, the identity of a vehicle to perform the trip, the day of the week when the trip departs from origin, and the day of the week when the trip arrives at its destination.

Moreover, a human transportation planner can specify settings such that trips which satisfy certain exception conditions cannot be auto-released, while trips with other exception conditions can be auto-released. In several embodiments, an exception condition is any condition which a planner may indicate requires an alert or notification for special attention inasmuch as the condition represents a particular potential problem or potential missed opportunity of notable magnitude. For example, a trip that will arrive at a destination after the delivery deadline at that destination of some order carried by the trip (by more than some threshold amount of time) suffers from a "late delivery" exception condition. As an additional example, a trip scheduled to spend less time at a pickup stop than is required to load the goods being picked up there (by more than some threshold amount of time) suffers from an "insufficient loading time" exception condition.

FIG. 2C illustrates a screen that is used in some embodiments to receive exception conditions from the human transportation planner. In FIG. 2C, each row represents a specific type of exception condition, as indicated in the "Exception Type" column 295. For convenient reference, the exception types are grouped into broader groupings, as indicated in the "Exception Group" column 294. For any exception type, the "Release" column 299 indicates "unrestricted" meaning that auto-release is allowed, or "manual", meaning that auto-release is not allowed (trips with this type of exception condition are restricted to manual release only). The "Rank" column 296 gives the order that different types of exception conditions should be displayed in when viewed in a summary report of all exception conditions. The "Threshold" column 297 (in conjunction with the "Unit of Measure" column 298) controls what level of severity will constitute an exception condition. For example, as shown, a delivery that is late by 60 minutes or more will constitute an exception condition; a delivery late but by less than 60 minutes will not. In the embodiment illustrated in FIG. 2C, there is no nominal 'restricted' value and instead the value 'manual' means restricted to manual release only.

Figure 3A:
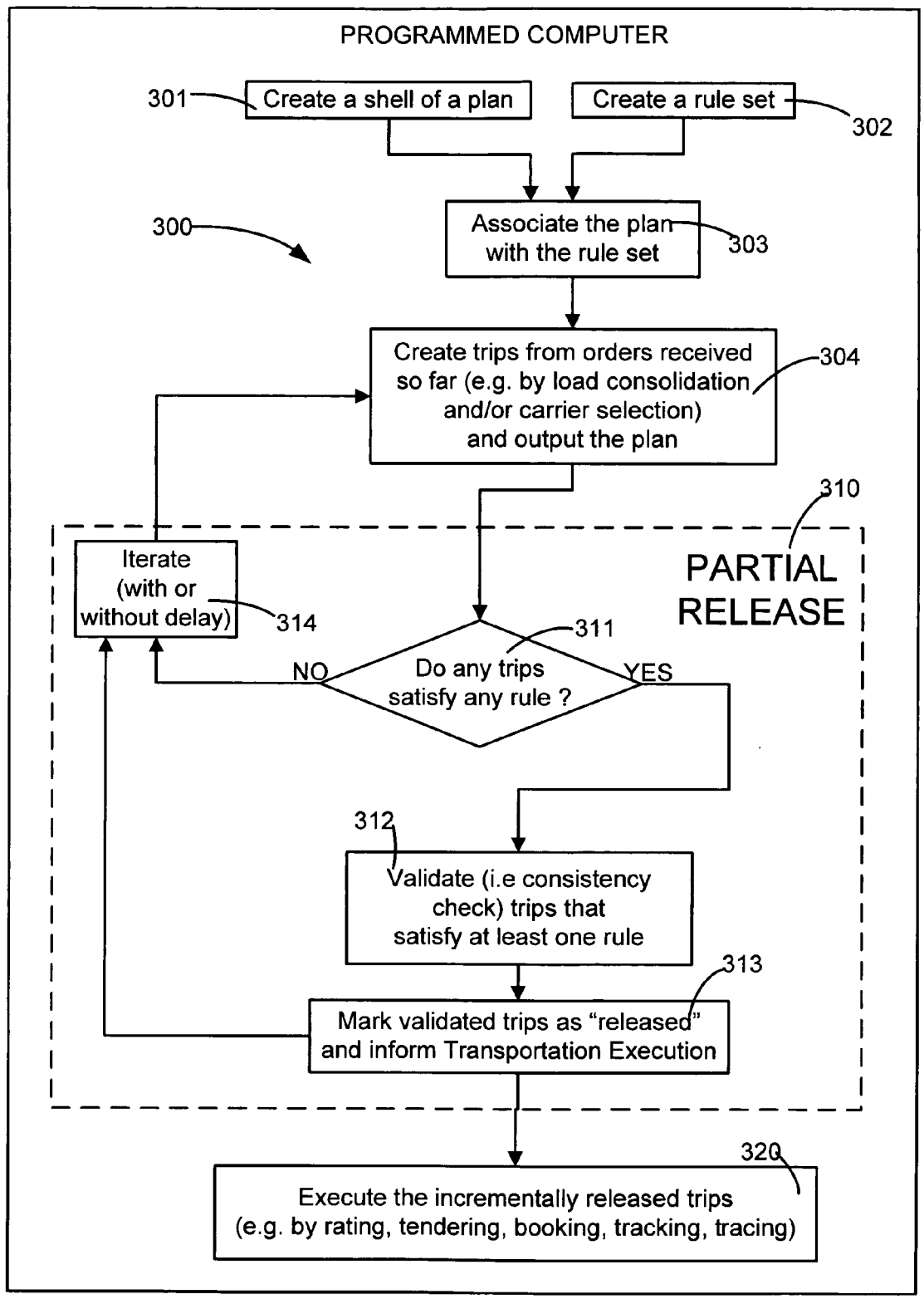
FIG. 3A illustrates, in an intermediate-level flow chart, certain acts that are performed in some embodiments, to implement partial release act 104A of FIG. 1B.

In several embodiments, a rule set and a shell for a plan are created independently of each other, as per acts 302 and 301 (FIG. 3A). Note that the plan itself has not yet been created, in act 301, and instead, just a shell for holding the plan has been created. Next, the rule set is associated with the plan, in act 303 e.g. as noted above in reference to FIG. 2A. Thereafter, in an act 304, the TP planning engine 101 (FIG. 1A) creates trips from the orders that have been received so far, and the plan is output in the normal manner (as a result of act 304). Next, in response to manual invocation or if invoked automatically on plan completion, operation 310 is performed, wherein one or more trips are released from the plan, based on the rules in the associated rule set (which was associated with the plan in act 303). The released trips are executed as per operation 320, in the normal manner.

In some embodiments, when performing operation 310, an act 311 is performed to check if any trip in the plan satisfies any rule in the rule set. If the answer is no, then control returns to iterating (via act 314) plan creation (in act 304). If the answer is yes, then the trips that satisfy at least one rule are validated as per act 312. During validation, the computer 100 is programmed to check that orders in each selected trip have not been changed via ERP software 108 (FIG. 1A). Next, trips that are validated are marked in act 313 as "released", and TP execution software 106 (FIG. 1A) is informed. Then control again returns to iterating (via act 314) plan creation (in act 304).

Figure 3B:
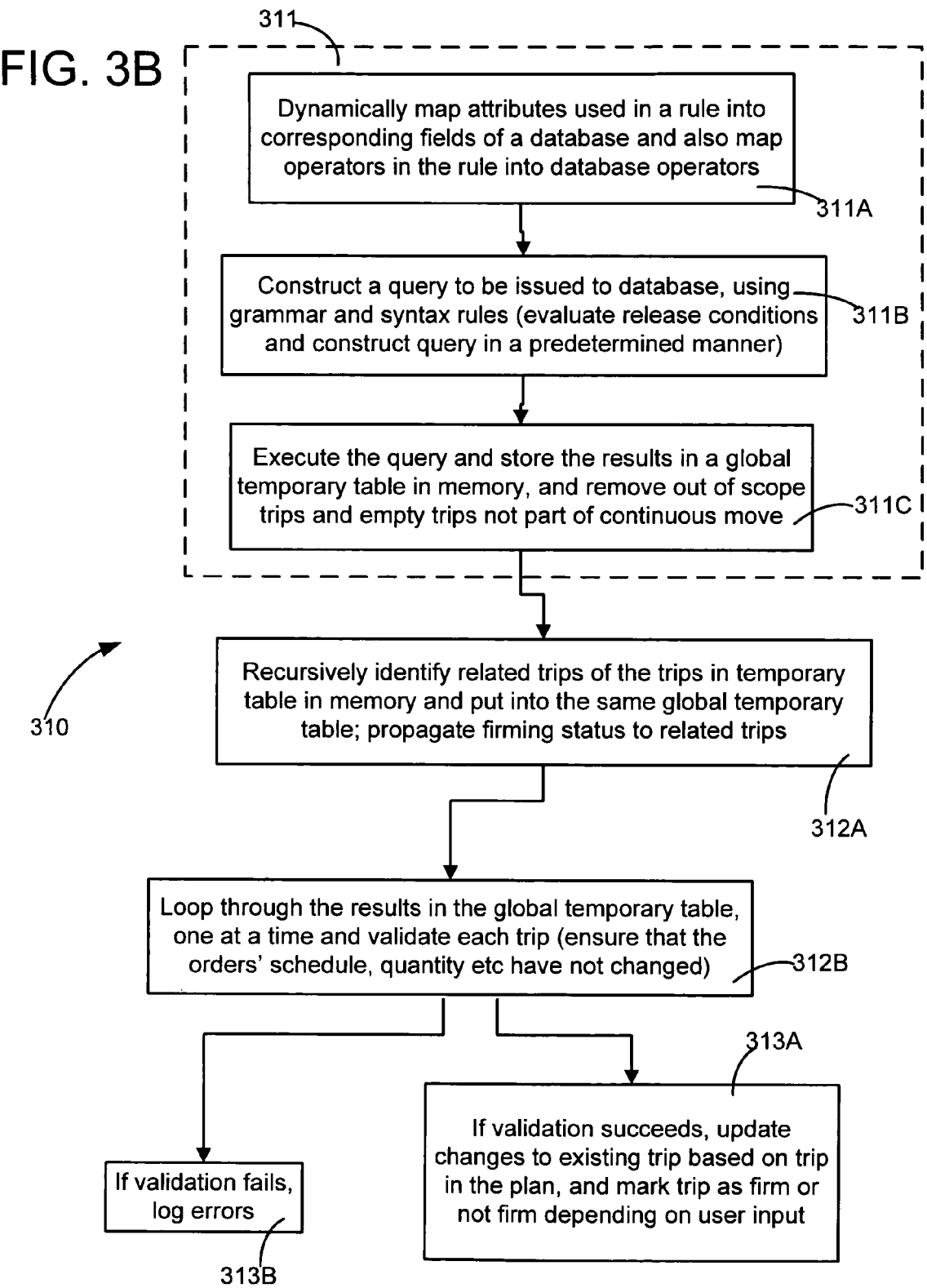
FIG. 3B illustrates, in a low-level flow chart, certain acts that are performed in some embodiments, to implement acts 311-313 of FIG. 3A.

Act 311 of FIG. 3A is implemented in a few embodiments by acts 311A-311C illustrated in FIG. 3B, as described next. Specifically, computer 100 is programmed to dynamically map, in act 311A, the attributes for each rule into corresponding fields of a database, and also map operators of each rule into database operators. In one illustrative embodiment, this mapping is done at run time for one condition of one rule at a time. Computer 100 is further programmed to dynamically (i.e. at run time) construct, in act 311B, a query to be issued to the database that contains the plan. The query may be in any language, including, for example, the structured query language (SQL) well known in the art. The query is constructed by the computer using predetermined grammar and predetermined syntax, to evaluate conditions in each rule (the database query is dynamically constructed using the user-specified conditions in a specific manner).

Note that in act 311B of several embodiments the programmed computer 100 also sets the firm status as per user input in the query itself. In one illustrative embodiment, a specific order used in constructing the query dynamically is as follows: first the where-clause of a query is constructed for individual rules by concatenating its individual conditions with "AND" operator. After this, the where-clause of query of every individual rule is concatenated together using "OR" operator. This final where-clause of query is used to identify candidate trips for auto-release. Thereafter, computer 100 is further programmed, in act 311C, to execute the dynamically-constructed query and store the results in a global temporary table in memory. In several embodiments, act 311C also removes out of scope trips and empty trips not part of a continuous move. For further details, please see FIG. 6C and Appendix A that is incorporated by reference herein in its entirety.

Next, in act 312A, the computer 100 uses the global temporary table to recursively identify associated trips of all trips in the global temporary table, and put the associated trips into the same temporary table. In act 312A, computer 100 also propagates firm status from each trip to its associated trips. Associated trips ('t$^+$') of a current trip t are (1) all trips which carry any of the same shipments assigned to current trip t; (2) all trips which carry any of the same shipments assigned to any other associated trip ('t$^+$'); (3) all trips which are part of a continuous move which current trip t is part of and (4) all trips which are part of any continuous moves which associated trip (t$^+$) is part of. All such associated trips need to be released for execution with the current trip in order to ensure complete, end-to-end execution of all shipments carried by the current trip and of all continuous moves that the current trip is part of.

Thereafter, computer 100 loops through the results in the global temporary table, one at a time (as per act 312B), and validates each trip by ensuring that the orders therein haven't changed (i.e. the quantity is the same, the schedule is the same etc). If validation fails, then an error is logged as per act 313B. If validation succeeds, then as per act 313A, the computer 100 updates a version of the trip as it was first created. Specifically, each trip in one embodiment may have three versions (A) when the trip was first created in the planning system and which is now present in the execution system, (B) a copy of the trip made in the planning system when the trip is being subsequently examined for re-planning and (C) when the trip has been changed in the planning system due to a change in itinerary (e.g. if an additional stop has been added to execute delivery of another order). During the just-described validation in act 312B, the computer checks if version B in the planning system is same as version A in the execution system.

Hence, when performing the just-described update in act 313A, version C updates version A in the execution system if version A has remained unchanged (i.e. was same as version B). Note that in some embodiments, this update is made in the same manner, regardless of whether the release was automated or manual. The details of such an update are not a critical aspect of the invention. In addition, in act 313A, the computer marks the trip as not firm or as routing firm or as routing and content firm, depending on the input received in screen 200. In some embodiments, an outline for implementing acts 311A, 311B and 311C is provided in Appendices A and FIGS. 6B-6D respectively.

Figure 4A:
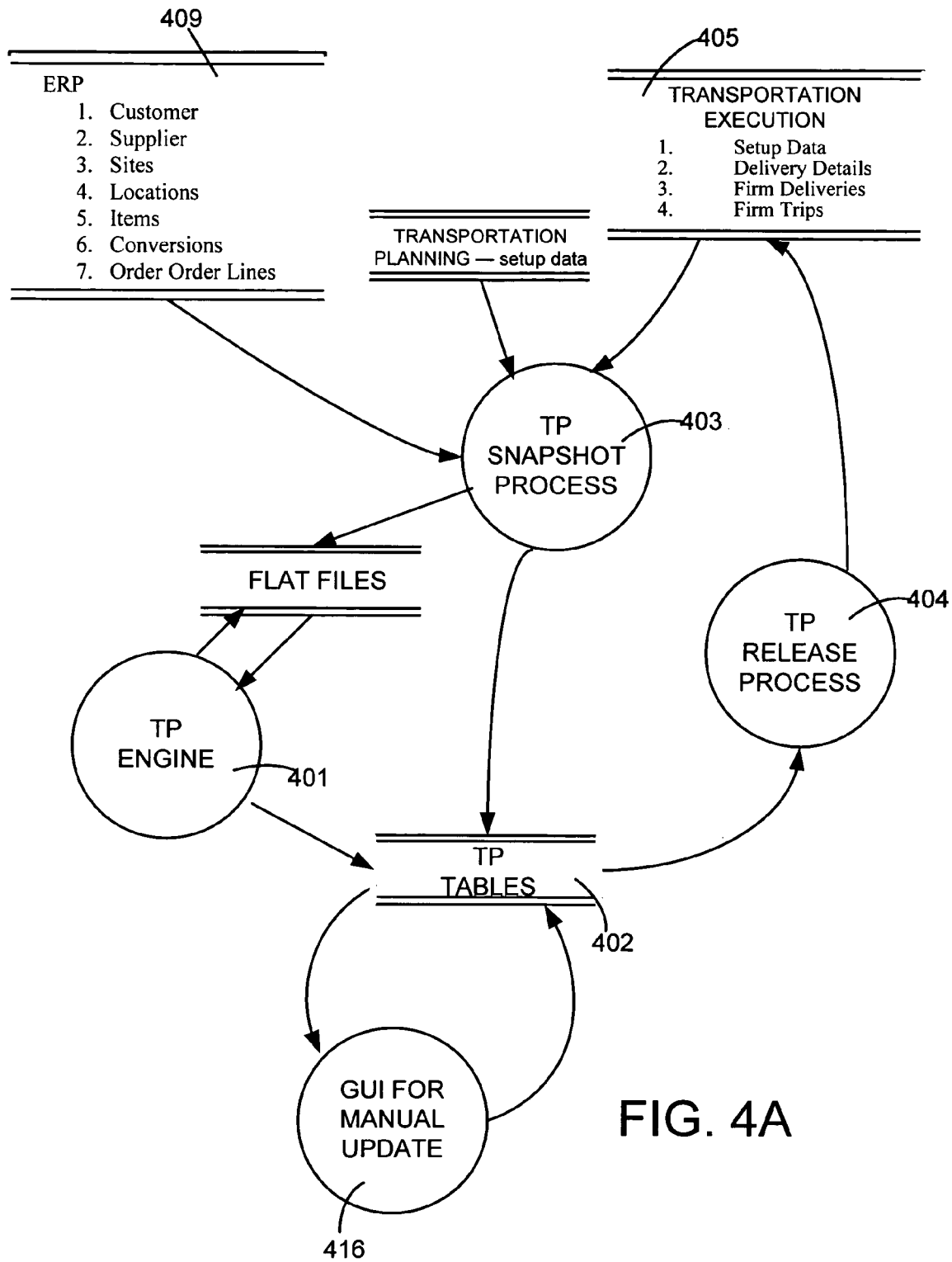

One illustrative embodiment of the invention is shown in FIGS. 4A-4D and described next. In the embodiment illustrated in FIG. 4A, many items are similar or identical to corresponding items in FIG. 1A, and hence reference numerals in FIG. 4A are obtained by adding 300 to corresponding reference numerals in FIG. 1A. Note that in FIG. 4A, a ERP table 409 holds the orders that are used by TP engine 401 in its planning process. Moreover, TP engine 401 provides its output in the form of TP tables 402 that contain the entire plan output by engine 401. Also, the TP release process 404 provides its partial plan in the form of a transportation execution table 405 (which is used by the transportation execution software).

In this embodiment, a graphical user interface 416 enables the human transportation planner to make changes to the plan in TP tables 402, e.g. to re-work trips before release to transportation execution software. Moreover, in this embodiment, a snapshot process 403, as a whole, brings all of the inputs into the transportation planning system—including the orders to be carried, all the details of the carriers that can carry them, and any firm trips. This particular part of the snapshot process—that which brings in firm trips—gives the transportation planning engine 401 visibility to which orders are already planned in a way that can't be changed.

In an alternative embodiment, the planning engine 401 leaves these orders alone simply by leaving them out of the snapshot (e.g. without snapshotting the "firm" trips). This alternative, however, does not give the planning engine 401 visibility to the trips carrying these orders, thus preventing it from making correct evaluation of progress against volume commitments to the carriers and of consumption of constrained capacity. Also, the alternative embodiment prevents the planning engine 401 from potentially carrying more orders on trips which are firm but have additional open space on board. Nonetheless, this alternative embodiment and other such embodiments have been contemplated by the inventors, as will be apparent from this disclosure. Note that the implementation of repository 402, 405 and 409 in FIG. 4A will be apparent to a skilled artisan in view of this disclosure.

In some embodiments of the invention, four different processes 451, 453, 455 and 458 as illustrated in FIG. 4B implement TP release process 404. Specifically, process 451 uses the TP tables 402 to identify as candidates any trips that may be released (including trips that satisfy the rules, and any associated trips).

Note that process 451 puts candidate trips into an array 452 that is read by process 453. Specifically, in process 451, first of all, candidate trips satisfying the rule set are identified and put into global temporary table 452 along with the intended firm status as indicated by the user in 210. Next, preliminary validation checks are applied. Empty trips not part of continuous moves and out-of-scope trips are removed from the candidate trip list in global temporary table. (The term "out of scope trips" here refers to trips not carrying orders that fall within the defined boundaries of the plan but appearing in it nonetheless because they are associated with trips that do carry such orders.) For remaining trips, their associated trips are identified recursively and put into the same global temporary table 452, whence groups of trips associated with each other are formed and to each group a unique group ID is assigned. Note that firm status is also propagated to the identified associated trips as per firming rules while putting associated trips into the global temporary table.

Next, a second level of validations is applied on each group. An entire group of trips is removed from the global temporary table, if any of its trip's departure dates have expired or any of its trips has at least one exception, the type of which is defined as "manual" (restricted) in the Global Preference controls (see column 299 in FIG. 2C). So, finally, now only those trips remain in global temporary table 452 that are valid and ready for release. At this stage, these trips along with their associated stops, deliveries, and delivery lines data are put into global temporary table 452 for use by subsequent process. Note that firm status is also propagated to deliveries as per firming rules while putting delivery data into global temporary table 452. See FIG. 6C for greater detail. In some embodiments, a single firm status for release may be specified for a rule set and all trips released due to any rule in the rule set are released with this firm status. In other embodiments, a different firm status may be specified for each rule in a rule set and the firm status a trip is released with is that status associated with the particular rule that led to its release.

Subsequently, process 453 pulls trip, trip stop, order, and shipment data from global temporary table 452 and puts them into interface table 454. Similarly, process 453 also pulls shipment-trip assignment data from tables 402 for identified candidates with that are firm and puts them into same interface table 454. In process 453 if the identified candidate is to be released as "not firm", there is no impact. Firming is done while identifying associated trips and deliveries and putting them into global temporary table 452.

Furthermore, process 455 pulls data from the Interface Tables 454, and validates the data against the transportation execution (TE) Tables 405. In some embodiments, process 455 is initiated soon after process 453 completes, by a TE Release API. The TE Release API is the code in the execution system 106 (FIG. 1A) for the "receiving end" of the release process. Details of the TE Release API are not a critical aspect of the invention. The "receiving end" of the process 106 works the same whether the release was done automatically using a rule-based mechanism as described herein or done manually by releasing a portion by brute force, or by releasing the whole plan in a batch job. Process 455 writes any failures in error interface table 457 that is read by process 458.

Process 458 uses the information from tables 454 and 457 to update Firm Status, which takes one of values "not firm", "routing firm", and "routing and contents firm". The net effect of this field is to communicate to users or the planning engine the current firm status of the trip and what changes can be made to it without adversely impacting the synchronization between the planning and execution systems. In some embodiments, this field is implemented by multiple subfields, such as release date, release status, planned flag and error message. The specific subfields that are used in any embodiment are not critical aspects of the invention.

Note further that in one embodiment, a global temporary table exists in a schema (called MST), whereas interface tables including an error interface table are part of another schema (called WSH). The terminology "Interface table", "global temporary table" is well understood by a skilled artisan and hence not described any further herein.

Figure 1B:
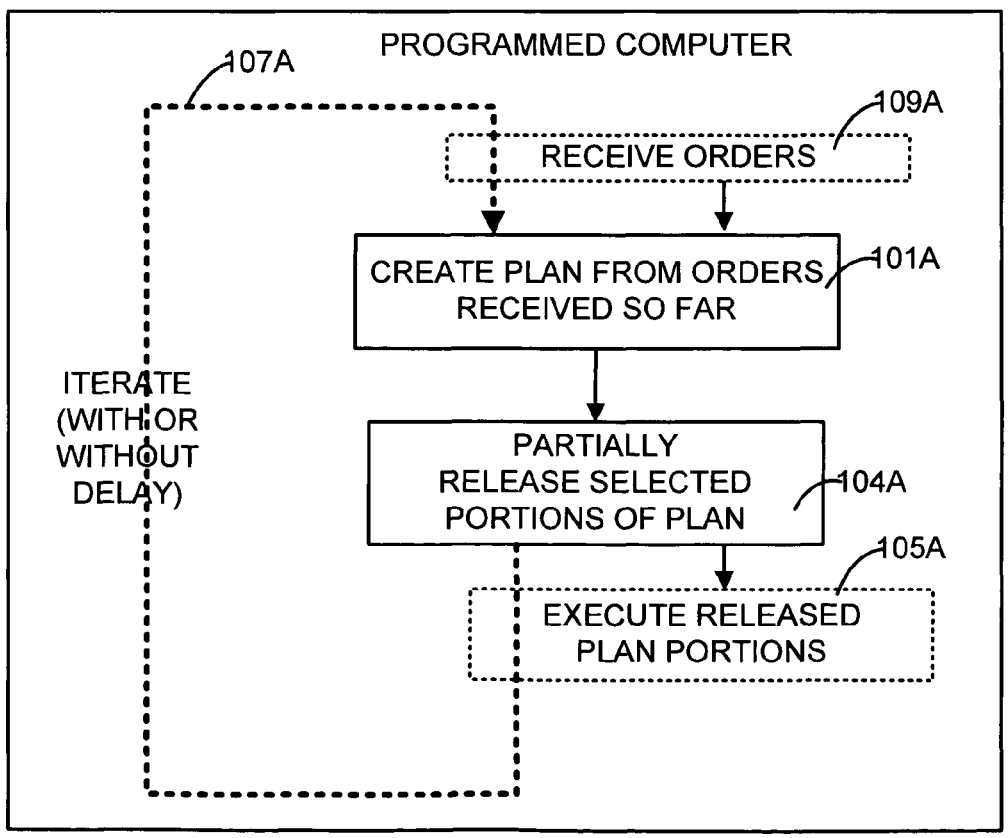
FIG. 1B illustrates, in a high-level flow chart, a method performed by a computer programmed in accordance with the invention to repeatedly create a plan in act 101A and partially release only a portion thereof in act 104A.

The method of FIG. 1B is used in some embodiments to program a computer system 500 of the type illustrated in FIG. 5A which is discussed next. Specifically, computer system 500 includes a bus 502 (FIG. 5A) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505.

Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, transportation planning is performed by computer system 500 in response to processor 505 executing one or more sequences of one or more instructions contained in main memory 506. Such instructions may be read into main memory 506 from another computer-readable medium, such as storage device 510. Execution of the sequences of instructions contained in main memory 506 causes processor 505 to perform the process steps described herein and illustrated in FIG. 1B. In alternative embodiments, hard-wired circuitry may be used in place of or in combination with software instructions to implement the invention. Thus, embodiments of the invention are not limited to any specific combination of hardware circuitry and software.

The term "non-transitory computer-readable medium" as used herein refers to any non-transitory medium that participates in providing instructions to processor 505 for execution.

Such a non-transitory medium may take many forms, including but not limited to, non-volatile media, and volatile media. Non-volatile media includes, for example, optical or magnetic disks, such as storage device 510. Volatile media includes dynamic memory, such as main memory 506.

Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge as described hereinafter, or any other non-transitory medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 505 retrieves and executes the instructions. The instructions received by main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer 525 or to data equipment operated by an Internet Service Provider (ISP) 526. ISP 526 in turn provides data communication services through the world wide packet data communication network 524, commonly referred to as the "Internet". Local network 522 and network 524 both use electrical, electromagnetic or optical signals that carry digital data streams. The signals through the various networks and the signals on network link 520 and through communication interface 515, which carry the digital data to and from computer system 500, are exemplary forms of carrier waves transporting the information.

Computer system 500 can send messages and receive data, including program code, through the network(s), network link 520 and communication interface 515. In the Internet example, a server 550 might transmit a mission (which is part of a transportation plan) through Internet 524, ISP 526, local network 522 and communication interface 515.

The instructions for performing the method of FIG. 1B may be executed by processor 505 as they are received, and/or stored in storage device 510, or other non-volatile storage for later execution. In this manner, computer system 500 may obtain the just-described instructions and any related data in the form of a carrier wave.

Figure 5A:
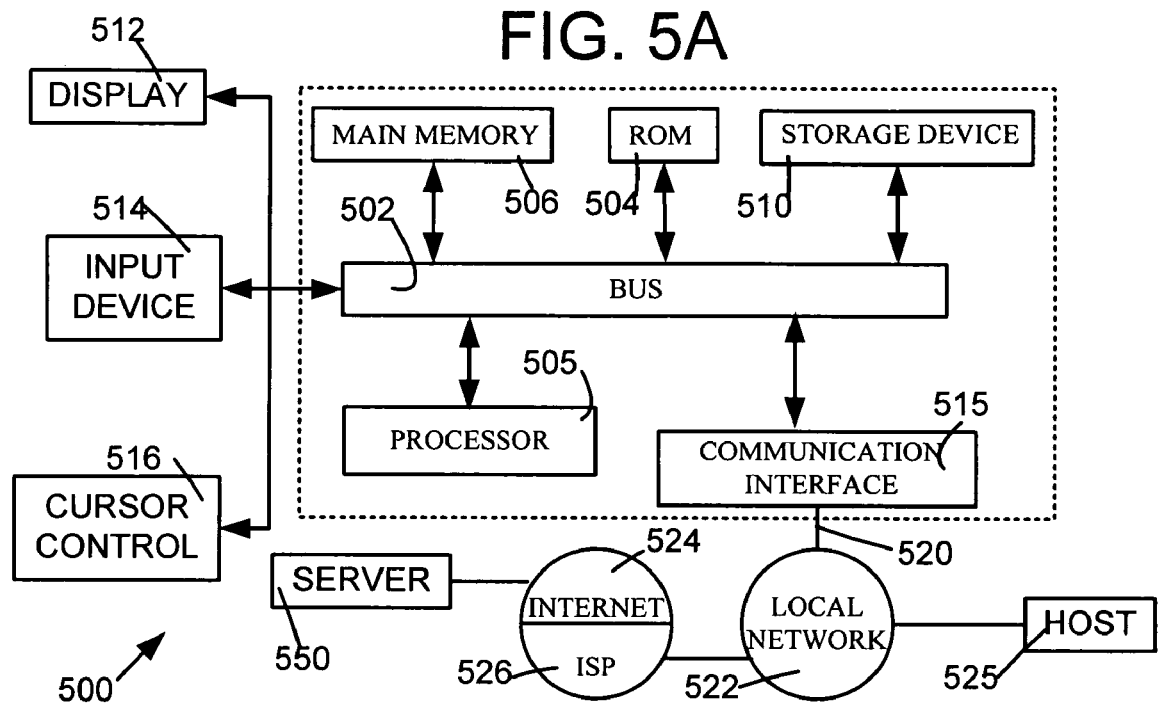
FIGS. 5A and 5B illustrate, in block diagrams, hardware and software portions of a computer that performs the method illustrated in FIG. 1B.
Figure 5B:
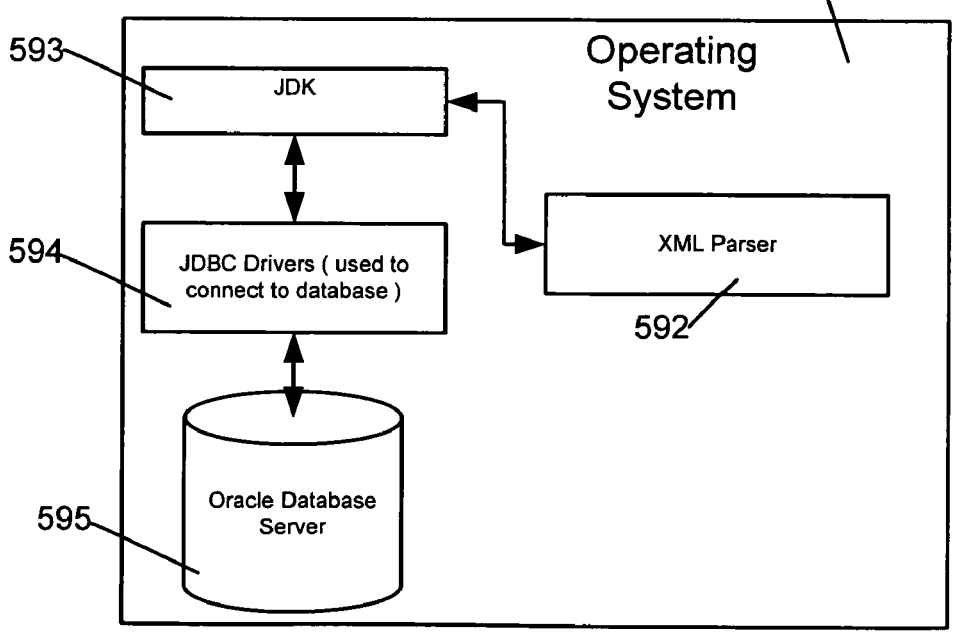

Note that FIG. 5A is a very low-level representation of many hardware components of a computer system. Several embodiments have one or more additional software components in main memory 506 as shown in FIG. 5B: Operating System 591 (e.g. Microsoft WINDOWS 2000), Database Server 595 (e.g. Oracle Server v9i2 for the source computer; e.g. Oracle Server v8i for the target computer), Java Development Kit 593 (e.g. JDK v118), Java XMLParser 592 (e.g. xmlparser available from Oracle Corporation), and JDBC drivers 594 (e.g. JDBC driver available from Oracle Corporation).

Some embodiments of the invention perform the acts illustrated in FIGS. 6A-6D, as described below. Specifically, in act 601, the programmed computer starts, from the transportation planning (TP) engine, the execution of a new process which performs the automatic release of trips that are satisfactory. Next, in act 602, the programmed computer (executing the new process) checks if the user (i.e. the human operator) has set an option for automatic release (i.e. selected button 204 in screen 200 in FIG. 2A). If the user has not enabled automatic release then the computer takes the no branch and stops doing any further work to release trips, In act 602, if the option is set then the computer (when appropriately programmed) proceeds to act 603.

In act 603, the computer generates a number to be used as a release identifier (such as by incrementing the most recently used release number or other sequence identifier) that is unique relative to any other release identifier. As will be apparent to the skilled artisan, this unique number is generated in the normal manner in which database sequence processes generate unique numbers. The terminology "database sequence" is well understood by a skilled artisan and hence not described any further herein. Moreover, the difference between two generated numbers is also not critical to this invention.

Next, in act 604, the computer invokes a concurrent program for the release process, and passes to that program a number of parameters, including the just-described release identifier, an identifier of the plan which is currently being prepared, and a release mode which is set to 1 indicating that the release is initiated automatically by the TP engine. Next, the programmed computer goes, from act 604 to act 605 wherein a release process (for selection of trips based on user-specified rules) is executed as illustrated in FIG. 6B and described below.

Figure 6A:
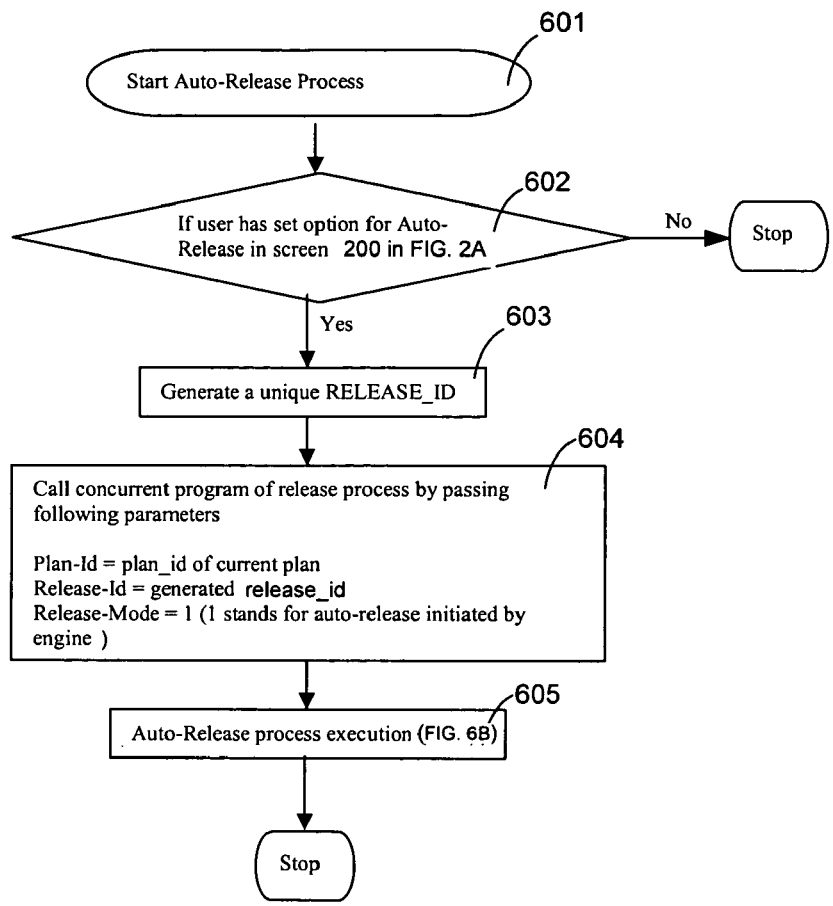
Figure 6B:
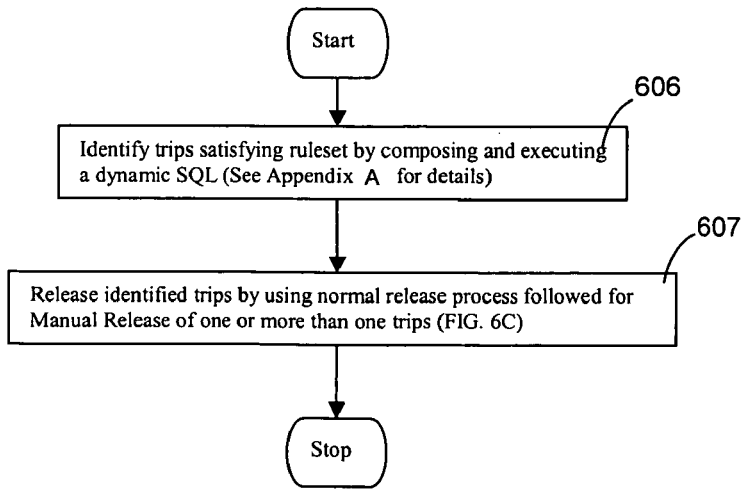
Figure 6E:
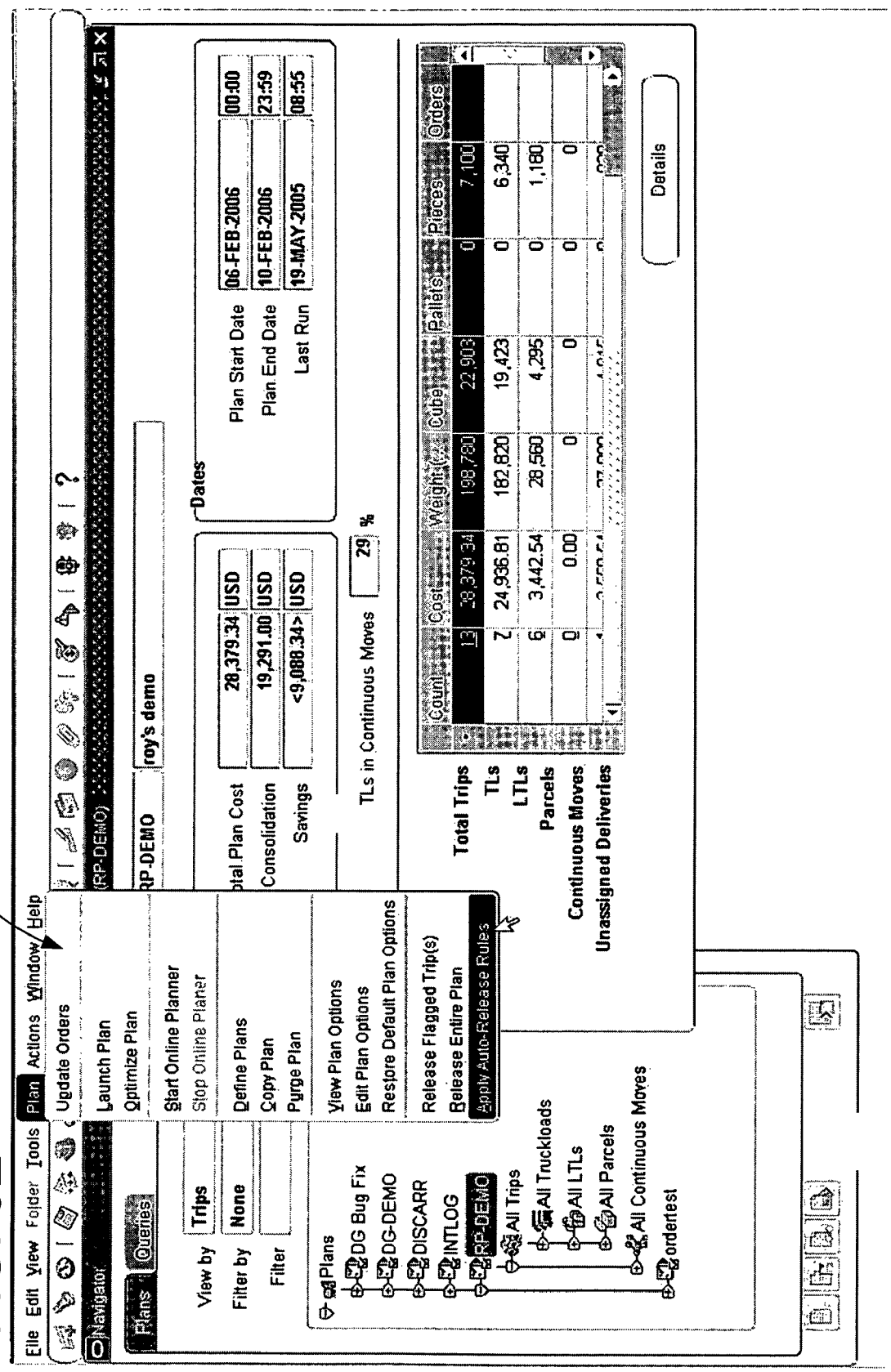
FIG. 6E illustrates, in a graphical user interface, a screen for receiving from a human transportation planner (i.e. operator or user) an instruction to release trips selected by application of predetermined rules.

In the illustrative embodiment being described, act 605 in FIG. 6A depicts the automatically-invoked release process as one of several acts being performed within the transportation planning component, whereas FIG. 6B represents acts 606 and 607 of a release process that are performed in a program outside of the transportation planning component. Note that this illustrative embodiment additionally supports a manual method for invoking the release process of FIG. 6B to perform rule-based release of trips (see last element in drop-down box 699 in FIG. 6E). Regardless of how invoked, the release process is based upon a rule set that is associated with the plan (or a rule set specified at invocation time), via a user interface. Manual invocation may be done by a human transportation planner via the screen in FIG. 6E at any time, for example, after a plan has been created and a portion thereof automatically released, following which the human operator manually re-worked one or more trips remaining in the plan.

In this illustrative embodiment, the acts shown in FIGS. 6B, 6C and 6D are used by both methods, i.e. the automatically-invoked rule-based release process, and the manually-invoked rule-based release process. Note that the acts illustrated in FIG. 6A correspond to the automatically-invoked rule-based release process. The rule-based release process that is manually invoked by the planner from a user interface (FIG. 6E) follows the same flow as that described above, but manual invocation occurs externally to the planning engine program and uses a different parameter value, e.g. Release_Mode=3 in act 604.

In act 606, the programmed computer identifies trips that satisfy the user-specified ruleset, by composing and executing a dynamic SQL query as illustrated in detail in Appendix A below. Next, in act 607 the programmed computer releases the trips that have been identified in act 606, using a release process that is used for manual release (of one or more user-selected trips but not the entire plan). Specific acts that are performed to implement act 606 can differ, depending on the embodiment, and for an exemplary embodiment a specific process 610 is illustrated in FIG. 6C and discussed below. After act 607 is completed, the programmed computer has completed the auto-release process and is now ready to repeat this process (if new trips are identified as being available for release).

In some illustrative embodiments, a computer is programmed to implement a process 610 by performing acts 611-624 illustrated in FIG. 6C. In act 611 the computer checks if any trip is available for release (as per act 606 in FIG. 6B), and if not the computer stops the automatic release of trips. If at least one trip is found to be available in act 611, the computer goes to act 612 and stores in a parameter "I_Time" the current time and date in the computer. Note that the parameter "I_Time" is used in act 623 (described below) while updating release date of trip in TP tables. Next, in act 613, the computer removes any empty trips that are not part of continuous moves. Note that empty trips will generally not exist upon completion of a plan optimization, if the rule-based release process is automatically invoked at that time as described herein for an automatic release process. Such trips may exist after human transportation planners work with a plan, however (e.g. when one or more trips are reworked). For instance, in the process of adding orders to a trip to increase its utilization, a human transportation planner may completely remove all of the existing orders on a different trip, thus making that different trip empty. Hence, if a rule-based release process is invoked manually from a user interface after trips in the plan have been re-worked by a planner, then empty trips may be found in the plan (after the release process completes). Thereafter, in act 614, the computer removes any trips that are out of scope.

Then, in act 615 in FIG. 6C, the programmed computer once again checks if any trip is available for release, and if not the computer stops the release of trips. Note that the just-described act 615 is same as an earlier-described act 611, except that act 615 is performed after acts 612 and 613 which may remove one or more trips, Next, in act 616, the programmed computer recursively identifies any available trips in the global temporary table, that are related to a current trip in the manner described herein for associated trips, and stores the identified trips as being associated with the current trip, in the global temporary table. For example, as noted above in paragraph [0049], two trips are deemed to be associated if they are part of a single continuous move, or if both trips carry a same delivery at different points in it's the delivery's itinerary, or if one of the two trips is associated with a third trip that is associated with the second of the two trips by one of the two means just described. Specific acts that are performed to implement act 616 can differ, depending on the embodiment, and for an exemplary embodiment the specific acts are illustrated in FIG. 6D by a process 630 that is discussed below.

Thereafter, as per act 617, the programmed computer removes any group of associated trips if for any trip in the group, the planned departure date has expired. Next, the computer goes to act 618, and removes any group of associated trips if any trip in the group has an exception whose release condition has been identified as "manual" (restricted) in the graphical user interface (i.e. by the operator), as illustrated in column 299 in FIG. 2C. Then, in act 619, the computer identifies deliveries of the remaining trips and populates the deliveries into a global temporary table with the firm status and variable called "interface_id" which is the primary key of the interface table 454 (FIG. 4B). Next, in act 620, the programmed computer identifies stops and orders of remaining trips and populates them into the global temporary table, and generates the interface_id variable (as noted above it is the primary key of table 454).

Thereafter, in act 621, the computer populates trips, stops, continuous moves, shipments, and orders data into the interfaces table 454, by taking this information from the global temporary table 452 and TP Tables 402. Next, in act 622, the computer validates the interface tables data against the data in the TE table 405. For those groups of trips whose data is unchanged in the TE table 405, the computer updates the TE table 405 to indicate that the trips in this group have been successfully released. For groups whose data is changed, the computer is programmed to update the interface error table 457 (FIG. 4B). Next, in act 623, the computer updates several parameters in the TP table 402 (FIG. 4B), such as the trip's firm status, release status, release date and auto-release flag. The computer also updates the delivery's attributes, such as the firm status in the TP table 402. The computer further logs the release status in a log file. Thereafter in act 624 the computer purges the interface table 454 and 457 (e.g. by removing all the data therein which was inserted during the release process) and then concludes process 610.

In some embodiments, the computer is programmed to execute a process 630 illustrated in FIG. 6D. Specifically, in act 631, the computer checks if any unprocessed trip exists in the global temporary table for the current release_id, and if not then process 630 is completed. Note that an identified associated trip may be marked as "unprocessed" in acts 636 and 637 which are described below (note that by default all the trips are set as "unprocessed"; and trip is marked as "processed" in act 638, after act 636 as noted below). If in act 631 there is found an unprocessed trip, then the programmed computer goes to act 632 and obtains from the global temporary table that trip's group_id, firm status, and continuous move information (identifying which trips are in which continuous moves and which continuous moves are firm vs. not firm.) Next, in act 633, the computer checks if the group_id is null and if not goes to act 634 to generate a unique group_id from sequence and assign the newly-generated group_id to the current trip.

Note that in this embodiment, the group_id is used to group all trips associated with each other. After identification of all the associated trips recursively, all the trips having the same group_id are identified as a group of trips. And either all the trips (having same group_id) of a group are (1) successfully released or (2) release failed or (3) removed from the queue of release because of validation failure of one or more than one trip in the group. So, eventually, in act 633 if a trip is found to have group_id equal to NULL means this trip has not yet been identified as associated with any other trip. Hence, a new group_id is generated and assigned to this trip. This essentially starts a formation of a new group which is identified by newly generated group_id. On the other hand, if group_id that is not NULL is already existing in act 633 then this means this trip has already been identified as an associated trip of another trip and is already part of a previously-formed group. Therefore, act 634 is skipped and after act 633, act 635 is performed.

In act 633 if the answer is yes, then the programmed computer goes to act 635 and checks if the current trip is part of a continuous move, and if yes goes to act 637 and if no goes to act 636. Note that act 635 is also performed on completion of act 634. In act 637 the computer identifies other trips that are part of the same continuous move. For these identified other trips, the computer performs a number of operations, as follows: (a) ensures them into the global temporary table with firming, (b) assigns the same group_id to all the trips and (c) marks them as being unprocessed, if they do not already exist in the global temporary table. Note that ensuring an associated trip in global temporary table with firming means if the identified trip is not already available in global temporary table then it is inserted into the same table and after that the appropriate firm status of identified trips is also set in the same table.

Thereafter, the computer goes to act 636 and identifies additional trips for which the just-described operations (a)-(c) of act 637 are performed, except that in act 636 the additional trips are identified due to sharing the delivery carried by the current trip. Next, current trip is marked as "processed" in act 638 and the computer returns to performing act 631 (discussed above).

Numerous modifications and adaptations of the embodiments described herein will become apparent to the skilled artisan in view of this disclosure.

Although many embodiments implement an auto-release mechanism to be executed instantaneously upon the completion of an optimization process, other embodiments include a capability to apply the subject rule set to trips in a plan on demand (e.g. by a human operator) at any time. For instance, after having made manual edits to the trips of a plan, the rule set can be invoked to release any trips that the edits have caused to meet the conditions of one of the rules in the rule set. Another embodiment applies the rule set on a fixed schedule so that, e.g., every 20 minutes, any trips that have come to meet rules in the rule set are "swept" into execution.

In some embodiments, a rule includes a first condition, a second condition and a Boolean operator therebetween; the first condition includes a first limit on a first attribute, and further includes a first operator; and the second condition includes a second limit on a second attribute, and further includes a second operator. In addition to (or instead of) setting up auto-release conditions via if-then rules with "AND" and "OR" conjunctions, some embodiments enable the human operator to specify additional criteria for auto-release of trips from a checklist of trip types or conditions. For example, one embodiment displays to the human operator a checklist of modes that could be checked off to specify auto-release of all air, ocean, and rail trips but no auto-release of truck trips.

Numerous modifications and adaptations of the embodiments described herein are encompassed by the scope of the invention.

APPENDIX A

Pseudocode (flow) for overall release process of one embodiment is as follows.

```
if no rule defined in current ruleset then exit the program
loop for each rule in ruleset
    set v-firm-status = firm status in which trips have to be auto-released as user
defined in screen 210
    set v-where-clause = ' (1 = 1 '
    loop for each condition in current rule
        set v-condition-attribute = attribute of current condition
        set v-condition-operator = operator of current condition
        set v-condition-from-value = from-value of current condition
        set v-condition-to-value = to-value of current condition
        if v-condition-attribute = 'CARRIER' then <<condition of rule>>
            -- possible value of v-condition-operator (=, !=)
            v-string = carrier_id || v-condition-operator || v-condition-from-value
        otherwise if v-condition-attribute = 'SUPPLIER' then <<condition of rule>>
            -- possible value of v-condition-operator (=, !=)
            v-string = trip_id IN (trip id of the plan from delivery legs for deliveries
                whose supplier_id || v-condition-operator || v-condition-from-value)
        otherwise if v-condition-attribute = 'CUSTOMER' then <<condition of
rule>>
            -- possible value of v-condition-operator (=, !=)
            v-string = trip_id IN (trip id of the plan from delivery legs for deliveries
                                        whose customer_id || v-condition-
operator || v-condition-from-value)
        otherwise if v-condition-attribute = 'MODE' then <<condition of rule>>
            -- possible value of v-condition-operator (=, !=)
            v-string = mode_of_transport || v-condition-operator || v-condition-from-
value
        otherwise if v-condition-attribute = 'UTILIZATION' then <<condition of
rule>>
            -- possible value of v-condition-operator (=, !=, <, <=, >, >=, is between)
            v_utilization = ' greatest(peak_weight_utilization,
peak_volume_utilization, peak_pallets_utilization) * 100 '
            if condition-operator = 'BETWEEN' then <<operator 1>>
                v-string = v-utilization || 'BETWEEN' || v-condition-from-value || '
```

-continued

```
AND ' || v-condition-to-value
        otherwise <<operator 1>>
            v-string = v-utilization || v-condition-operator || v-condition-from-value
        end <<operator 1>>
    otherwise if condition-attribute = 'REMAINING-TIME' then <<condition of
rule>>
        -- possible value of v-condition-operator (=, !=, <, <=, >, >=, is between)
        v-remaining-time = ' (trip_start_date – sysdate) * 24 '
        if condition-operator = 'BETWEEN' then <<operator 2>>
            v-string = v-remaining-time || 'BETWEEN' || v-condition-from-value || '
AND ' || v-condition-to-value
        otherwise <<operator 2>>
            v-string = v-remaining-time || v-condition-operator || v-condition-from-
value
        end <<operator 2>>
    otherwise if condition-attribute = 'CIRCUITY' then <<condition of rule>>
        -- possible value of v-condition-operator (=, !=, <, <=, >, >=, is between)
        v_circuity = ' (total_trip_distance / total_direct_distance –1 )*100 '
        if condition-operator = 'BETWEEN' then <<operator 3>>
            v-string = v_circuity || 'BETWEEN' || v-condition-from-value || ' AND '
|| v-condition-to-value
        otherwise <<operator 3>>
            v-string = v_circuity || v-condition-operator || v-condition-from-value
        end <<operator 3>>
    end <<condition of rule>>
    v-where-clause = v-where-clause || ' AND ' || v-string
  next condition in current rule
  where-clause = where-clause || v-where-clause || ' ) OR '
  next rule in ruleset
remove last three characters from the composed where-clause
  construct a string of insert statement to put trips with firm status = v-firm-status
from table mst_trips satisfying constructed where-clause with into global
temporary table in memory (example of string is given below)
  ' insert into (plan_id, trip_id, planned_flag, ......)
    (select plan_id, trip_id, v-firm-status, .........
    from mst_trips
    where ' || where-clause
```

Note: carrier_id, trip_id, mode_of transport, peak_weight_utilization, peak_volume_utilization, peak_pallets_utilization, trip_start_date, total_trip_distance, planned_flag, and total_direct_distance are attributes of trips. These are present in table mst_trips as column. Table mst_trips contains planned trip data. And supplier_id, and customer_id are attribute of deliveries. These two columns are present in mst_deliveries which contains delivery's data.

What is claimed is:

1. A computer-implemented method of planning movement of freight using vehicles, the method comprising:
receiving in a computer, a plurality of trips to be performed to move freight using vehicles;
wherein each trip comprises a group of orders to move goods by a single vehicle performing said each trip;
receiving input through fields in at least one screen of a user interface, to identify a plurality of rules, at least one rule comprising a first condition and a second condition;
said computer using a predetermined grammar and a predetermined syntax to dynamically construct a query to be issued to a database, at least by concatenating the first condition, the second condition and a Boolean operator between the first condition and the second condition to form said at least one rule; and
releasing by said computer storing into computer memory, a subset of trips automatically selected at least partially by execution of said query, from among said plurality of trips;
wherein at least said subset of trips are created prior to said execution of said query.

2. The method of claim 1 wherein during the execution of the query at least one value in the first condition is compared by said computer with a first attribute.

3. The method of claim 2 further comprising:
computing said first attribute based on a difference between (1) total distance of a trip having multiple stops and (2) direct distance between an origin and a destination of said trip.

4. The method of claim 2 wherein:
said first attribute is utilization of capacity of a vehicle to be used to perform a trip; and
said at least one value comprises a minimum limit.

5. The method of claim 2 wherein said at least one value is hereinafter "first" value, and wherein:
said at least one rule further comprises a second value compared by said computer, with said first attribute.

6. The method of claim 1 further comprising:
marking in said computer memory a first trip in said subset of trips as "not firm" if said trip conforms to at least a first rule in said plurality of rules;
marking in said computer memory a second trip in said subset of trips as "routing firm" if said second trip conforms to at least a second rule in said plurality of rules; and
marking in said computer memory a third trip in said subset of trips as "routing and contents firm" if said third trip conforms to at least a third rule in of said plurality of rules;
wherein orders in a trip marked "not firm" continue to be taken into account in planning.

7. The method of claim 1 wherein during selection of said subset of trips, said computer:
stores results of execution in a global temporary table in memory;
recursively identifies any additional trips that are associated with trips identified in the global temporary table; and
releases said additional trips.

8. The method of claim 1 further comprising:
repeatedly performing at least said releasing.

9. The method of claim 8 wherein said repeatedly performing is performed on a predetermined schedule.

10. The method of claim 8 wherein said repeatedly performing is performed after a predetermined delay following said releasing.

11. The method of claim 8 wherein said repeatedly performing is performed without delay following said releasing.

12. The method of claim 1 wherein said releasing is performed by said computer, in response to additional input in said user interface.

13. The method of claim 1 wherein said releasing is performed by said computer automatically, in response to said receiving of said plurality of trips.

14. A non-transitory computer-readable medium comprising instructions to plan movement of freight using vehicles, wherein said instructions are at least to:
receive a plurality of trips to be performed to move freight using vehicles;
wherein each trip comprises a group of orders to move goods by a single vehicle performing said each trip;
dynamically construct a query to be issued to a database, to evaluate at least two conditions in a rule in a plurality of rules by concatenating at least said two conditions in forming said rule;
wherein said at least two conditions comprise a first condition and a second condition and the rule comprises a Boolean operator between the first condition and the second condition and said Boolean operator is concatenated in forming said rule, by said instructions to dynamically construct the query; and
release a subset of trips automatically selected at least partially by execution of the query, from among said plurality of trips;
wherein at least said subset of trips are created prior to said execution of said query.

15. The non-transitory computer-readable medium of claim 14 wherein:
the first condition comprises a first limit on a first attribute, and further comprises a first operator; and
the second condition comprises a second limit on a second attribute, and further comprises a second operator.

16. The method of claim 1 further comprising:
said computer receiving through the user interface, additional input indicative of a selection of another rule in said plurality of rules.

17. The method of claim 1 wherein:
each trip in said subset is automatically selected by said computer based on said each trip satisfying at least one rule in said plurality of rules.

18. The non-transitory computer-readable medium of claim 14 further comprising instructions to:
mark in a computer memory, a first trip in said subset of trips as "not firm" when said first trip conforms to at least a first rule in said plurality of rules;
wherein orders in any trip marked "not firm" continue to be taken into account by said instructions to plan until marked "firm".

19. An apparatus for planning movement of freight using vehicles, the apparatus comprising:
means for receiving in a computer, a plurality of trips to be performed to move freight using vehicles;
wherein each trip comprises a group of orders to move goods by a single vehicle performing said each trip;
means for constructing a query to be issued to a database, to evaluate at least two conditions in a rule in a plurality of rules by concatenating at least said two conditions in forming said rule;
wherein said at least two conditions comprise a first condition and a second condition and the rule comprises a Boolean operator between the first condition and the second condition and said Boolean operator is concatenated in forming said rule, by said instructions to dynamically construct the query; and
means for releasing a subset of trips automatically selected at least partially by execution of the query, from among said plurality of trips;
wherein at least said subset of trips are created prior to said execution of said query by said means for releasing.

20. The apparatus of claim 19 wherein:
the first condition comprises a first limit on a first attribute, and further comprises a first operator; and
the second condition comprises a second limit on a second attribute, and further comprises a second operator.

21. The method of claim 1 wherein:
the first condition comprises a first limit on a first attribute, and further comprises a first operator; and
the second condition comprises a second limit on a second attribute, and further comprises a second operator.

* * * * *

UNITED STATES PATENT AND TRADEMARK OFFICE
CERTIFICATE OF CORRECTION

PATENT NO. : 8,046,161 B2
APPLICATION NO. : 11/173314
DATED : October 25, 2011
INVENTOR(S) : Peterkofsky et al.

Page 1 of 1

It is certified that error appears in the above-identified patent and that said Letters Patent is hereby corrected as shown below:

On sheet 7 of 12, in figure 4B, Reference Numeral 455, line 5, delete "Intiated" and insert -- Initiated --, therefor.

In column 5, line 64, after "Md. 20850" insert -- ; --.

In column 6, line 5, delete "Manahattan" and insert -- Manhattan --, therefor.

In column 20, line 57, in Claim 6, after "in" delete "of".

Signed and Sealed this
Thirty-first Day of January, 2012

David J. Kappos
*Director of the United States Patent and Trademark Office*